No. 764,136. PATENTED JULY 5, 1904.
O. S. LEELAND.
STEREOSCOPIC ATTACHMENT.
APPLICATION FILED NOV. 28, 1903.
NO MODEL.
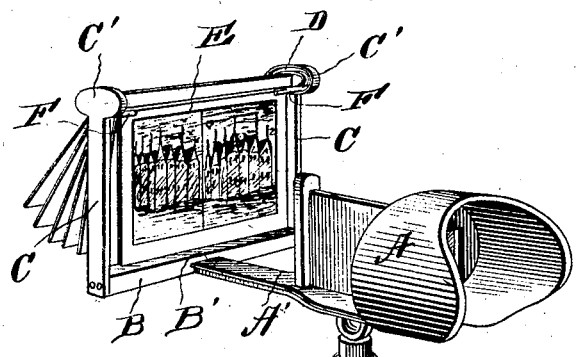
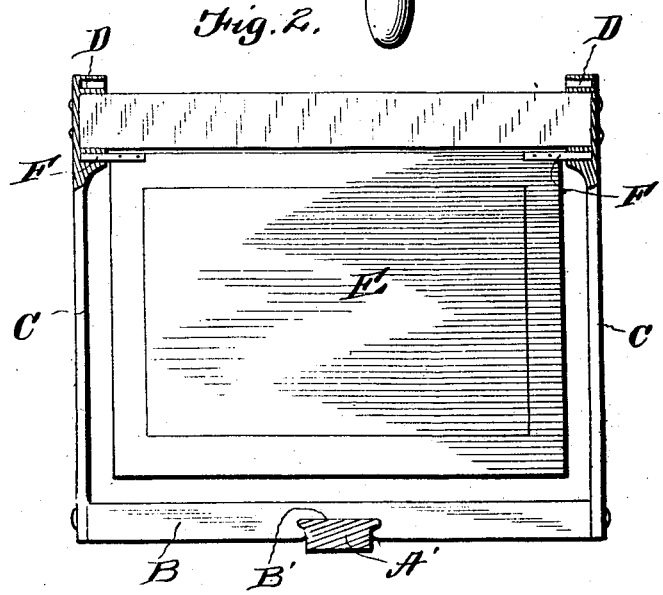
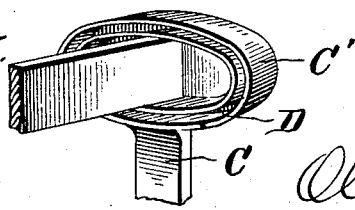

No. 764,136. Patented July 5, 1904.

UNITED STATES PATENT OFFICE.

OLE S. LEELAND, OF MOUNT VERNON, SOUTH DAKOTA.

STEREOSCOPIC ATTACHMENT.

SPECIFICATION forming part of Letters Patent No. 764,136, dated July 5, 1904.

Application filed November 28, 1903. Serial No. 183,042. (No model.)

*To all whom it may concern:*

Be it known that I, OLE S. LEELAND, a citizen of the United States, residing at Mount Vernon, in the county of Davison and State of South Dakota, have invented certain new and useful Improvements in Stereoscopic Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in stereoscopic devices; and the object of the invention is to produce an apparatus for a stereoscope in which a series of pictures may be held and conveniently displayed, and comprises curved tracks or byways supported upon suitable standards and adapted to receive pivot-pins projecting from the upper ends of a series of pictures and so arranged that a picture may be raised and turned over, which movement advances the next picture to a position to be viewed.

The invention consists, further, in various details of construction and in combinations and arrangements of parts, which will be hereinafter fully described and then specifically defined in the appended claim.

My invention is illustrated in the accompanying drawings, in which—

Figure 1 is a perspective view of my improved stereoscopic attachment. Fig. 2 is a sectional view showing the manner of connection of the pictures with the standards, and Fig. 3 is an enlarged detail view of one of the guideways or tracks in which the pivot-pins carried by the pictures travel.

Reference now being had to the details of the drawings by letter, A designates a stereoscope of the usual construction, having an extension A', which carries my attachment, comprising a frame or rack with cross-piece B, having a recessed portion B', adapted to receive the shank portion A'. Rising from the ends of said cross-piece B are the supporting-standards C, the upper end of each standard terminating in a headed portion C', which is closed on its outer face and has a curved groove D formed in the inner face thereof. E designates pictures, the upper edges of which are fastened to pivot-pins F, which are adapted to be inserted in said grooves D and to travel therein. In making up pictures it is preferable in order to increase the capacity of the series to place photographs upon each side of the mounts, and when one series has been viewed the frame B may be reversed upon the extension A' and the other series viewed by turning one picture up over after another.

The operation of my device is simple and consists simply in raising the picture by its lower free edge, causing the pivots at the upper ends of the pictures to turn in the guideways D, and as the picture is allowed to fall over backward it will advance the other pictures to a position occupied by the photograph disclosed in the drawings and in focus of the lenses of the instrument.

While I have shown a particular detailed construction of apparatus illustrating the features of my invention, it will be understood that I may make alterations, if desired, in certain details of construction without in any way departing from the spirit of the invention.

Having thus fully described my invention, what I claim as new, and desire to secure by Letters Patent, is—

A stereoscopic attachment comprising a rack slidingly held upon the extension of a stereoscope, the vertical portions of said rack having oval outlined, hollow-headed portions, a concentric oval-shaped band mounted within each of said headed portions and spaced apart from the inner wall of said head affording a guideway, a cross-piece fitted centrally within said oval-shaped band and fastened to the walls of said headed portions, a series of pictures having a pin secured to their inner longitudinal edges adapted to travel in the spaces intermediate said band and headed portion of the stand, as set forth.

In testimony whereof I hereunto affix my signature in presence of two witnesses.

OLE S. LEELAND.

Witnesses:
W. H. WAGNER,
J. N. OPPEDAHL.